W. O. KUHN.
TRANSMISSION GEARING FOR MOTOR VEHICLES.
APPLICATION FILED MAY 2, 1918.

1,307,632.

Patented June 24, 1919.
2 SHEETS—SHEET 1.

Inventor
W. O. Kuhn
By Pierre Barnes
Attorney

W. O. KUHN.
TRANSMISSION GEARING FOR MOTOR VEHICLES.
APPLICATION FILED MAY 2, 1918.
1,307,632.
Patented June 24, 1919.
2 SHEETS—SHEET 2.
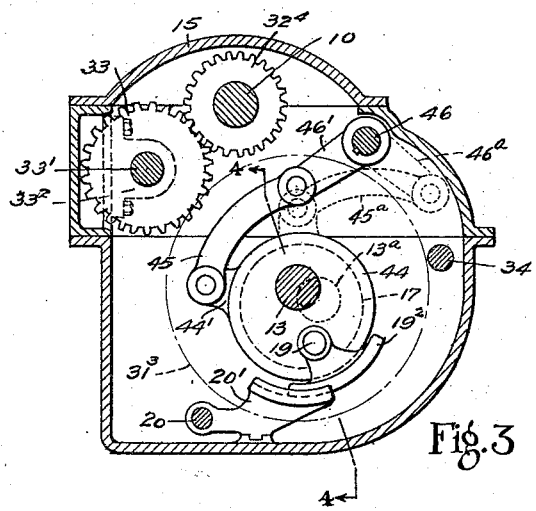
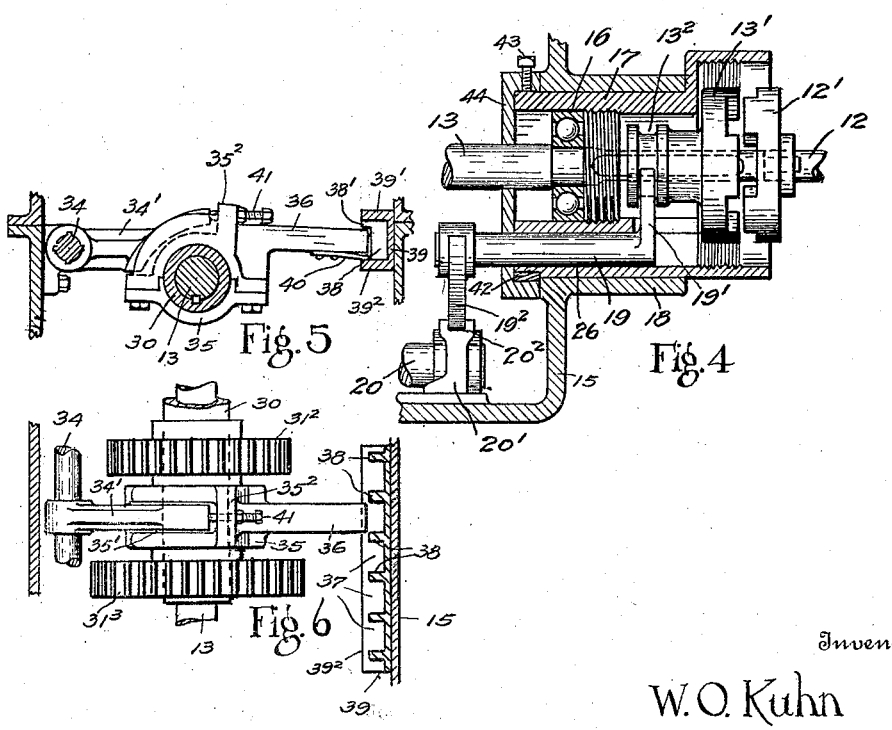
Inventor
W. O. Kuhn
By Pierre Barnes
Attorney

UNITED STATES PATENT OFFICE.

WILLIAM O. KUHN, OF SEATTLE, WASHINGTON, ASSIGNOR TO KUHN TRACTOR TRUCK COMPANY, OF SEATTLE, WASHINGTON, A CORPORATION OF WASHINGTON.

TRANSMISSION-GEARING FOR MOTOR-VEHICLES.

1,307,632. Specification of Letters Patent. Patented June 24, 1919.

Application filed May 2, 1918. Serial No. 232,140.

*To all whom it may concern:*

Be it known that I, WILLIAM O. KUHN, a citizen of the United States, residing at Seattle, in the county of King and State of Washington, have invented certain new and useful Improvements in Transmission-Gearing for Motor-Vehicles, of which the following is a specification.

This invention relates to improvements in the vehicle transmission-gearing illustrated and described in U. S. Patent No. 1, 187,340 issued to me June 13, 1916.

The object of the present invention is to simplify and perfect the above mentioned patented invention to render the same more convenient to regulate, more reliable in operation and, generally, to improve its efficiency.

The invention consists in the novel construction, adaption, arrangement and combination of parts as will be hereinafter described and claimed.

In the accompanying drawings,—

Figure 1:
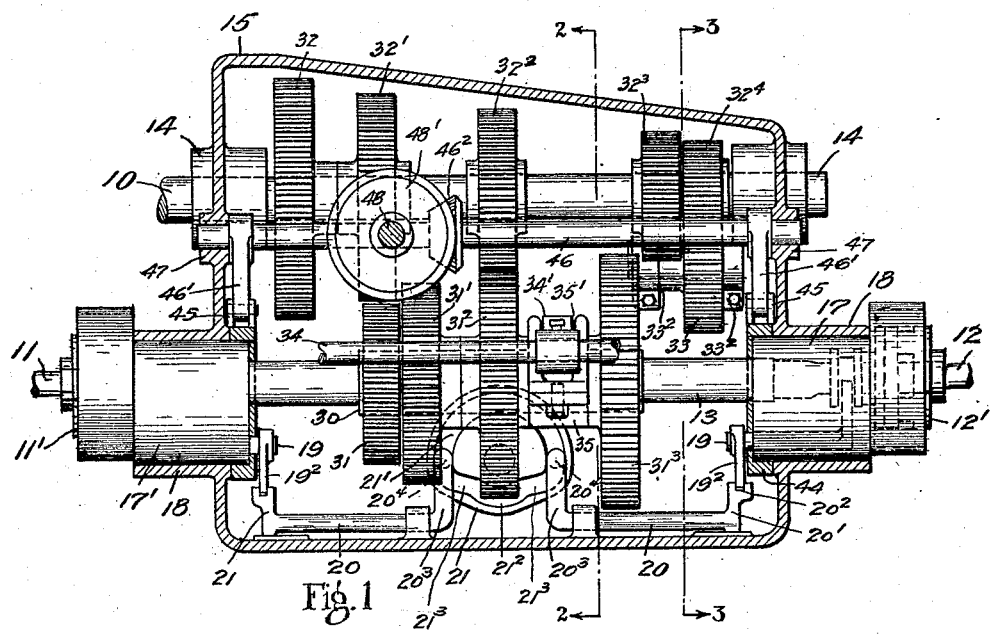
Figure 2:
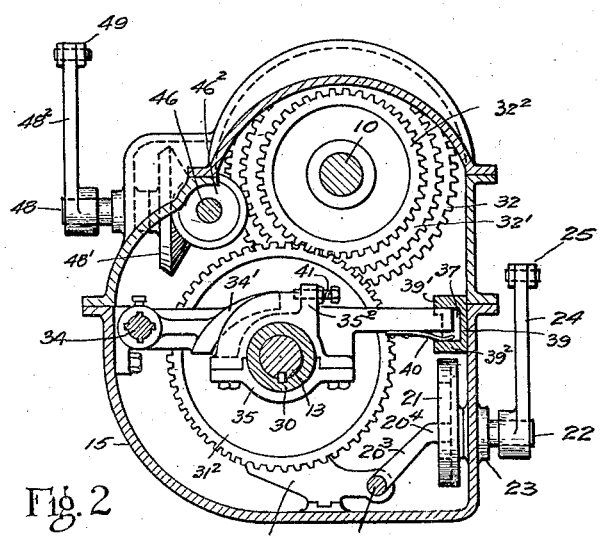

Figure 1 is a side elevational view of mechanism embodying my improvements with the containing casing shown in longitudinal section. Fig. 2 is a sectional view through 2—2 of Fig. 1. Fig. 3 is a sectional view through 3—3 of Fig. 1. Fig. 4 is a detail sectional view through 4—4 of Fig. 3. Fig. 5 is a fragmentary sectional view through 2—2 of Fig. 1, to illustrate the gear lock disengaged. Fig. 6 is a plan view with the casing in horizontal section.

The reference numeral 10 designates the power shaft, and 11 and 12 the shafts from which the front and rear traction wheels of a vehicle are driven through the medium of an "intermediate" shaft 13. The shaft 10 is journaled in bearing boxes 14 provided at the opposite ends of the gear-casing 15, and the shaft 13 is journaled in bearings such as 16 in Fig. 4, which are arranged eccentrically in hollow cylinders 17 and $17^1$ rotatable in bearing boxes 18 provided at the opposite ends of said casing. $11^1$ and $12^1$ represent clutch members preferably of the "horn" type keyed to the shafts 11 and 12 and adapted to be engaged by complementary clutch members such as $13^1$, Fig. 4, splined to the ends of the shaft 13 for coupling the latter to the wheel-driving shafts 11 and 12. The clutch members $13^1$ are moved into or out of engagement with the clutch members $11^1$ and $12^1$ by means of shifter bars 19 and 20 by means of a controlling cam 21 mounted on a rocker shaft 22 extending through a boss 23, Fig. 2, of the casing and operated through the medium of a crank arm 24 on the rocker shaft and a manually actuated controller rod, indicated by 25.

The shifter bars 19 are each mounted for endwise movements in a bearing 26 provided in a cylinder, as 17, Fig. 4, and is provided at its outer and inner ends with arms $19^1$ and $19^2$ which respectively engage in a peripheral groove $13^2$ of a shiftable clutch member and a groove $20^2$ of an arm $20^1$ at the outer end of the associated shifter bar 20. The shifter bars 20 are provided at their inner ends with arms $20^3$ having extremities $20^4$ engaging in a cam slot provided in the sam 21 at diametrically opposite sides of the axis of the latter.

Said cam slot is formed to provide two arcuate portions $21^1$ and $21^2$ (see Fig. 1) concentric to and at diametrically opposite sides of the cam axis, but of different radii. The slot portion $21^1$ of greater diameter, moreover, is of a circumferential length of at least 180° and communicates from its ends by groove portions $21^3$ with the ends of the concentric portion $21^2$. When the cam 21 is in the rotary position in which it is represented in Fig. 1, both of the arm extremities $20^4$ are in the cam plot portion $21^1$ to cause both pairs of shifting bars 19, 20 to be positioned to maintain both of the clutches engaged whereby the front and rear traction wheels are in driving connection. By turning the rocker shaft 22 in one rotary direction or the other, the cam 21 is influenced to selectively cause the arm extremities $20^4$ to be coincidently brought into the slot portions $21^1$ and $21^2$ resulting in the disengagement of one of said clutches while the other clutch remains engaged. From the foregoing it is evident that the clutches can be regulated to effect the driving of the vehicle by both the front and rear wheels in unison or either of them individually.

Splined upon the intermediate shaft 13 is a sleeve 30 carrying a plurality of spaced spur gears 31, $31^1$, $31^2$ and $31^3$ which are adapted to mesh respectively with spur gears 32, $32^1$, $32^2$ and $32^3$ which are fixedly mounted on the power shaft 10 to be driven by the latter to afford various speeds to said intermediate shaft for propelling the vehicle ahead. The gear wheel 31³, moreover, is engageable with a gear wheel 33 provided on a counter shaft 33¹ which is journaled in boxes, such as 33². The gear 33 being in continuous mesh with a gear 32⁴ on the power shaft whereby reverse rotary motion may be imparted to said intermediate shaft for backing the vehicle.

The sleeve 30 is shifted by means of a manually operated controlling rod 34 having an arm 34¹ which extends into a recess 35¹ of a collar 35 which is seated on the sleeve between the hubs of the gears 31² and 31³. In order to insure the sleeve being properly shifted to present a selected one of the gears on the sleeve in engageable position with respect to its companion gear on the power shaft, I provide a latch finger 36 on the collar to engage in a suitably disposed recess of a series of recesses 37 provided between ribs 38 of a rack 39 secured to the casing at the opposite side of the intermediate shaft 13 from the rod 34. The ribs 38 extend between upper and lower flange elements 39¹ and 39² of the rack and are each formed to provide a protuberance 38¹ immediately below the upper flange element 39¹. The latch finger 36 is yieldingly held against the upper flange element of the rack by means of a spring 40 secured to said latch finger and bearing on the lower rack flange 39². To enable the sleeve to be shifted for adjustably moving the gears therewith, the latch finger must first be withdrawn from its position in which it is engaged in a rack recess (see Fig. 2) into the position in which it is illustrated in Fig. 5, that is to say, be withdrawn from a recess and held below the protuberances 38¹. These functions, as will be presently explained, are effected by moving the shaft 13, to carry the collar 35 therewith until after a set screw 41 provided in a lug 35² of the collar encounters the end of arm 34¹ to cause the latch finger to be forced downwardly below the plane of the bottoms of protuberances 38¹ in opposition to the spring 40.

Secured to each of the cylinders 17 and 17¹, as by means of a key 42 and set screw 43 Fig. 4, is a cap or head 44 having an arm 44¹ which is connected, as shown in Fig. 3, by means of a link 45 with an arm 46¹ of a shaft 46 which is journaled in bearing boxes 47 provided in the casing end walls. The shaft 46 is operatively connected by bevel gears 46² and 48¹ with a transversely arranged shaft 48 which is journaled in the casing. 48² represents an arm secured to shaft 48 exteriorly of the casing and is connected to a controlling rod, indicated by 49, by which rotary movements are imparted to shaft 48 for the purpose of turning shaft 46 to simultaneously rotate the cylinders 17 and 17¹ in which the intermediate shaft 13 is eccentrically journaled.

The links 45, one for each of said cylinder heads, and the associated arms 46¹ constitute, in effect, pairs of toggle elements which upon being brought into the relative positions in which illustrated by full lines in Fig. 3 serve to lock the eccentrics or cylinders in position to hold the shaft 13 in its operative position. When in its inoperative position the referred to links and arms will occupy the positions in which they are indicated by dotted lines 45ᵃ and 46ᵃ in Fig. 3.

To vary the speed of rotation of the shaft 13 from which the traction-wheels drivingshafts 11 and 12 are driven, the operator, by means of the arm 48² rotates the shaft 48 to impart through the medium of bevel gears 48¹ and 46² rotary motion to the shaft 46 so that the arms 46¹ and links 45 will act through the medium of the heads 44 to turn the connected cylinders, thereby causing the shaft 13 which is eccentrically mounted therein to be moved into the position indicated by dotted lines 13ᵃ in Fig. 3, whereupon all of the spur gears of the intermediate shaft are out of mesh with the gears of the power shaft. As the shaft 13 is thus displaced the latch finger 36, as above explained, is withdrawn from its engagement in the rack 39 and also by being forced down by the screw 41 impinging the end of arm 34¹, said finger will be temporarily held below the rack proturbances 38¹. The operator thereupon, and through the agency of the rod 34 shifts the sleeve 30 to present a predetermined one of the spur gears on the power shaft. This being accomplished, the operator again acting through the medium of the rod 49, and bevel gears 48¹ and 46² rotates the shaft 46 so that the cylinders 17, 17¹ will be rotated to restore the shaft 13 into its original position to cause the selected spur gear on sleeve 30 to engage its companion gear on the power shaft. During the last described operation the shaft 13 thrusts the latch finger 36 into engagement with the rack and the screw 41 is withdrawn from the arm 34¹, the spring 40 then acts to raise the latch finger into its Fig. 3 engaged position.

From the foregoing it is seen that the shiftable gears are locked by the latch finger and rack against axial displacement until disengaged from its driving gear by being moved radially therefrom with the intermediate shaft. The latch finger, moreover remains operative to prevent the axial movement of the shiftable gears until nearly the end of the retracting movement of the shaft 13 when the screw 41 is affected by the arm 34¹ to swerve the finger latch downwardly.

The devices for controlling the clutch mechanisms by means of a cam so that either or both of the shafts 11 and 12 may be rendered operable or otherwise is an important part of the present invention.

What I claim, is,—

1. In transmission mechanism for motor vehicles the combination with a power driven shaft, a pair of axially alined shafts, a shaft intermediate of said alined shafts, speed changing gears for operatively connecting said power shaft and said intermediate shaft, and means to regulate said gears to change the rotary speed of said intermediate shaft, of clutches for coupling said alined shafts with the intermediate shaft, and manually controlled means for regulating said clutches whereby both or either of said alined shafts selectively may be driven from the intermediate shaft.

2. In transmission mechanism for motor vehicles a power driven shaft, a plurality of spur gears fixedly mounted thereon, a second shaft, a sleeve splined thereon, a plurality of change speed gears mounted on said sleeve, means to move the second named shaft and the sleeve thereon toward and from the first named shaft, means loosely mounted on the sleeve and engageable with a relatively stationary rack for locking said sleeve against axial movements, means for displacing said second shaft to disengage the gears thereon from the gears of the power shaft and also serving to disengage the aforesaid means from said rack, and means to shift said sleeve to present a selected gear thereon into engageable relation with respect to a gear on said power shaft.

3. In transmission gearing for motor vehicles, the combination with a casing, a power driven shaft journaled in bearings provided in said casing, a second shaft, cylinders rotatable in the casing and provided with eccentric bearings for the second named shaft, spur gears fixedly secured to said power shaft, a sleeve splined on the second named shaft, spur gears mounted on said sleeve, and a locking device carried by said sleeve and engageable in a rack provided in the casing, of means for rotating said cylinders whereby the gears of the second named shaft may be moved into or out of engaging relations with the gears of said power shaft, said means also serving to render said locking device operative or inoperative, and means for imparting axial movements to said sleeve when the locking device is disengaged from said rack to effect the shifting of the sleeve gears.

4. In transmission mechanism for motor vehicles the combination of a power driven shaft, spur gears fixedly mounted thereon, a second shaft arranged for movement toward and from said power shaft, a sleeve splined to said second shaft, spur gears fixedly mounted on said sleeve, a collar mounted on the sleeve, a latch finger provided on said collar, means engageable with said finger for securing said sleeve from axial movement when any one of the gears thereon is engaged with a gear on said power shaft, devices acting through the medium of said collar for axially shifting the sleeve and gears thereon, and means for moving said second shaft and the sleeve to cause the gears of the latter to be in engagement with or disengaged from the gears of said power shaft and also serving in coöperation with said devices to effect the disengagement of said finger from said first named means.

Signed at Seattle, Washington, this 22nd day of April 1918.

WILLIAM O. KUHN.

Witnesses:
 PIERRE BARNES,
 HANNAH JONES.

Copies of this patent may be obtained for five cents each, by addressing the "Commissioner of Patents, Washington, D. C."